United States Patent

[11] 3,563,496

[72] Inventor Daniel R. Zuck
 1427 Beaver St., San Fernando, Calif.
 91340
[21] Appl. No. 645,861
[22] Filed June 12, 1967
[45] Patented Feb. 16, 1971

[54] COMPOUND HELICOPTER
 13 Claims, 21 Drawing Figs.
[52] U.S. Cl. .................................................. 244/7,
   244/17.19, 170/135.22
[51] Int. Cl. .............................................. B64c 27/22
[50] Field of Search .................................... 244/17.19,
   17.21, 17.11, 17.15, 17.17, 17.23, 17.25, 29, 6, 7,
   51, 86, 87, 91, 92; 170/135.22, 135.24, 160.13,
   160.25, 160.1

[56] References Cited
 UNITED STATES PATENTS
| | | | |
|---|---|---|---|
| 2,381,417 | 8/1945 | Adams | 170/135.22 |
| 2,478,847 | 8/1949 | Stuart, III | 244/7 |
| 2,433,641 | 12/1947 | Young | 244/51 |
| 2,698,147 | 12/1954 | Hovgard | 244/7 |
| 3,222,012 | 12/1965 | Piasecki | 244/17.21X |
| 3,260,482 | 7/1966 | Stroukoff | 244/17.19X |
| 3,288,397 | 11/1966 | Fitzpatrick | 244/29 |
| 3,393,747 | 7/1968 | Laufer | 170/135.24 |
| 3,448,946 | 6/1969 | Nagatsu | 244/17.19 |

*Primary Examiner*—Milton Buchler
*Assistant Examiner*—Paul E. Sauberer

ABSTRACT: This invention relates to aircraft commonly referred to as a Compound Helicopter, and more particularly to certain new and useful improvements in aircraft which are capable of vertical takeoff and landing at zero horizontal velocity, and which are capable of horizontal cruising flight similar to the conventionally winged type airplanes.

This aircraft contains the unique novelty of utilizing the propeller for conventional forward thrust when the aircraft is in the high speed forward flight configuration, and conversely utilizing the same propeller in combination with a cyclic pitch control to the said propeller and a controllable slotted fin to produce a variable aerodynamic force 90° to the propeller axis at the command of the pilot in opposition to the rotor torque when the aircraft hovers or takes off and lands vertically in the helicopter configuration.

INVENTOR.
BY Daniel R Zuck

INVENTOR.
BY Daniel R. Zuck

PATENTED FEB 16 1971 3,563,496

INVENTOR.
BY Daniel R. Zuck

INVENTOR.
BY Daniel R. Zuck

INVENTOR.
BY Daniel R. Zuck

COMPOUND HELICOPTER

Figure 9:
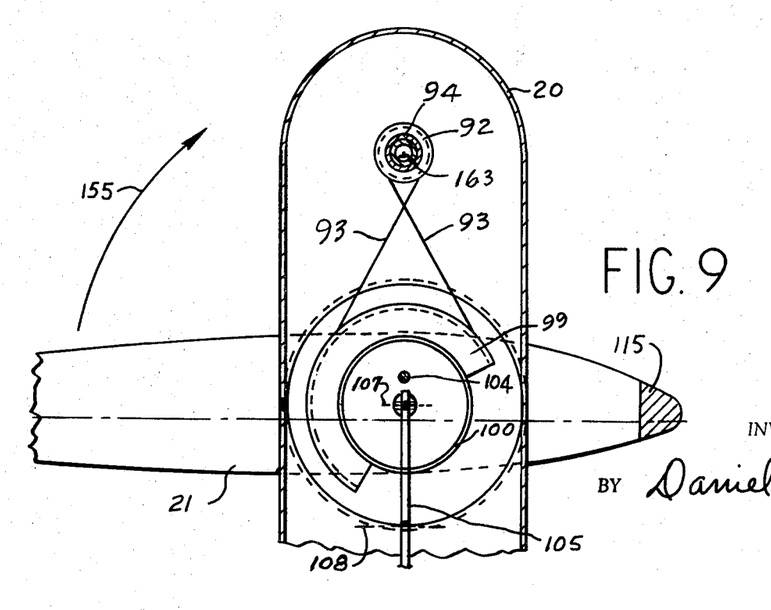
FIG. 9 is an enlarged section taken on the line 9-9 in FIG. 8 showing the rotor feathering means.
Figures 15, 16, 17:
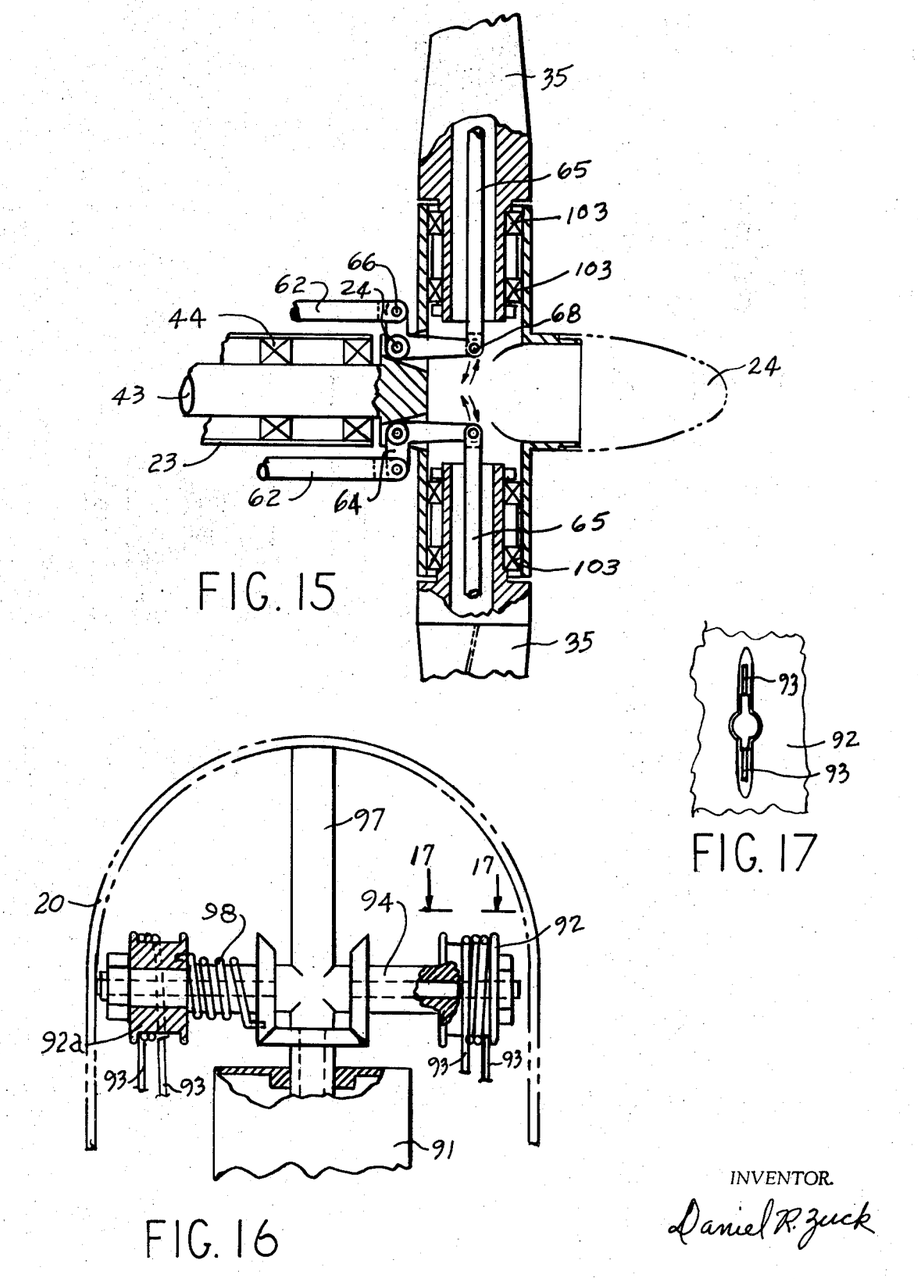
FIG. 15 is an enlarged detailed sectional view taken on line 15–15 in FIG. 1, showing attachment of the rocker arms in the propeller hub.
FIG. 16 is an enlarged section taken on the line 16–16 in FIG. 8 showing the sheaves 92 and 92a with the cables 93.
FIG. 17 is an enlarged detail view taken on the line 17–17 in FIG. 16 showing cable 93 attachment.

The aircraft discloses a unique and novel means to feather the helicopter rotor blades for minimum drag in FIGS. 9 and 16. This novel disclosure permits the aircraft to convert from a helicopter flight configuration to airplane flight configuration and vice versa while the aircraft is in the air in forward flight.

Figure 10:
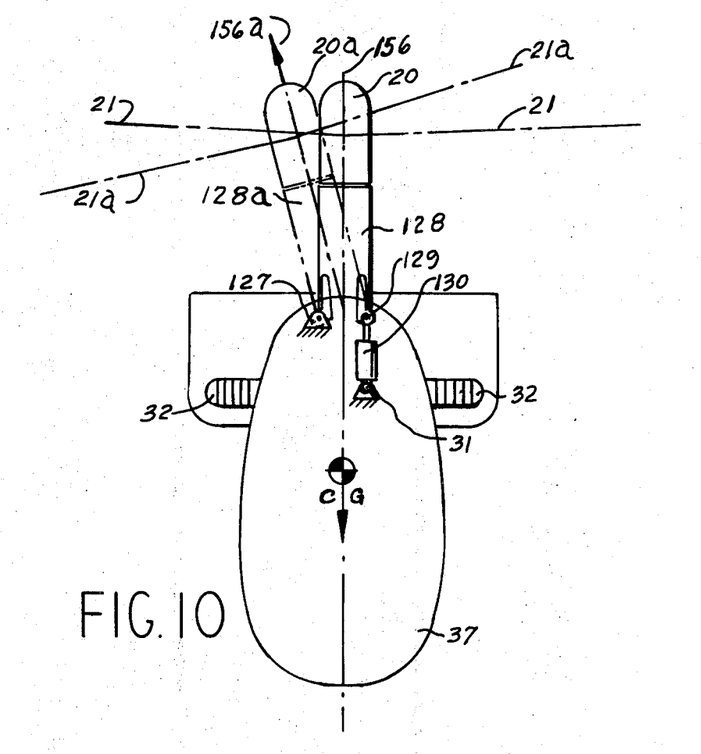
FIG. 10 is an enlarged section taken on the line 10–10 in FIG. 2 showing the rotor tilt or trim means.

When the aircraft transitions from hovering or vertical flight in the helicopter configuration to forward flight a novel and unique trim balance means displacing the rotor shaft is provided as shown in FIG. 10.

Figure 1:
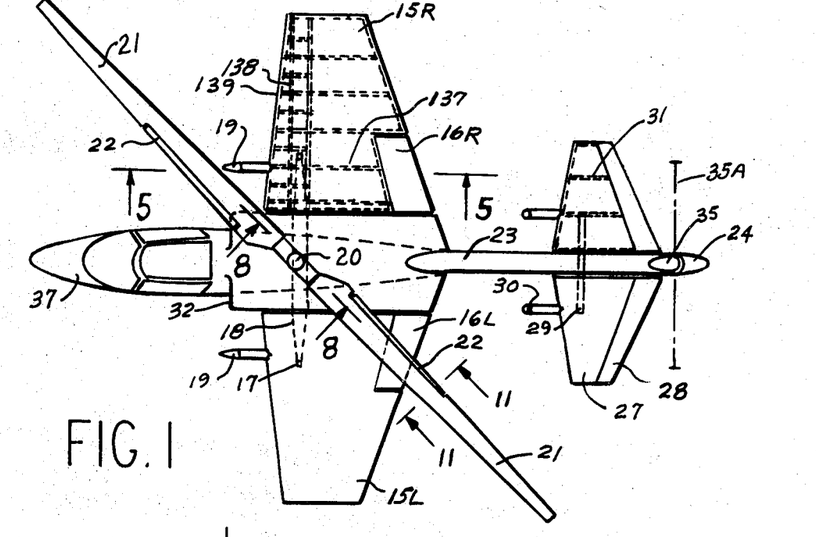
FIG. 1 is a plan view of the aircraft.
Figure 1A:
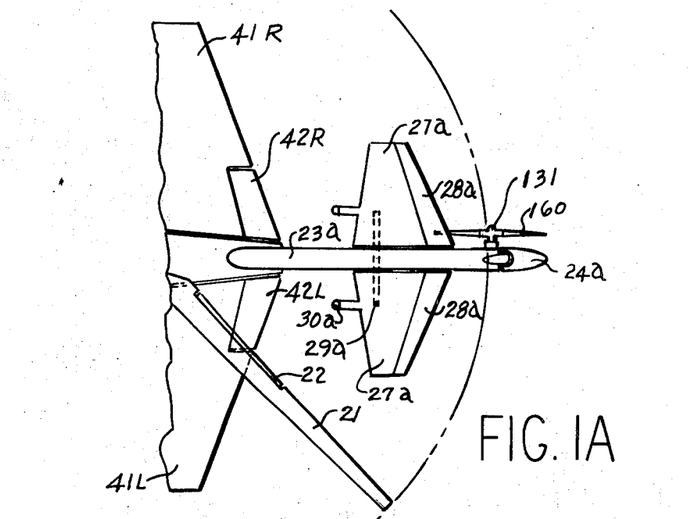
FIG. 1A is a fragmental plan view of the aircraft with an alternate antitorque rotor.
Figure 2:
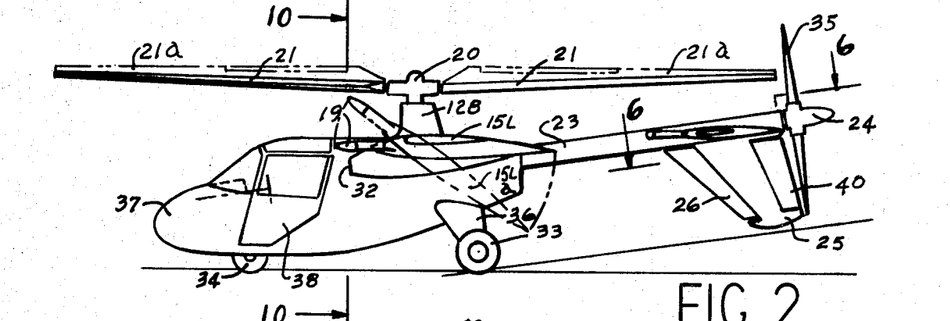
FIG. 2 is a side view of the aircraft.
Figure 2A:
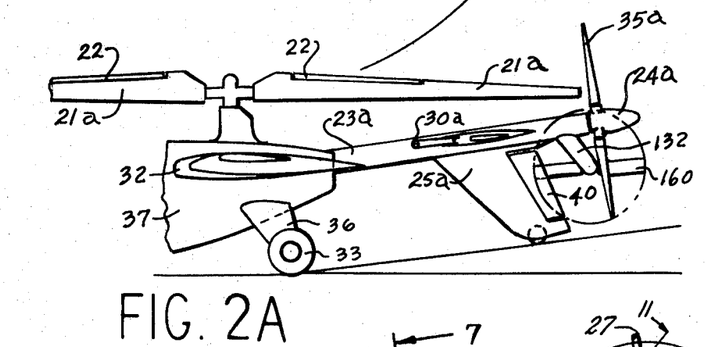
FIG. 2A is a fragmental side view of the aircraft with an alternate antitorque rotor.
Figures 4, 12:
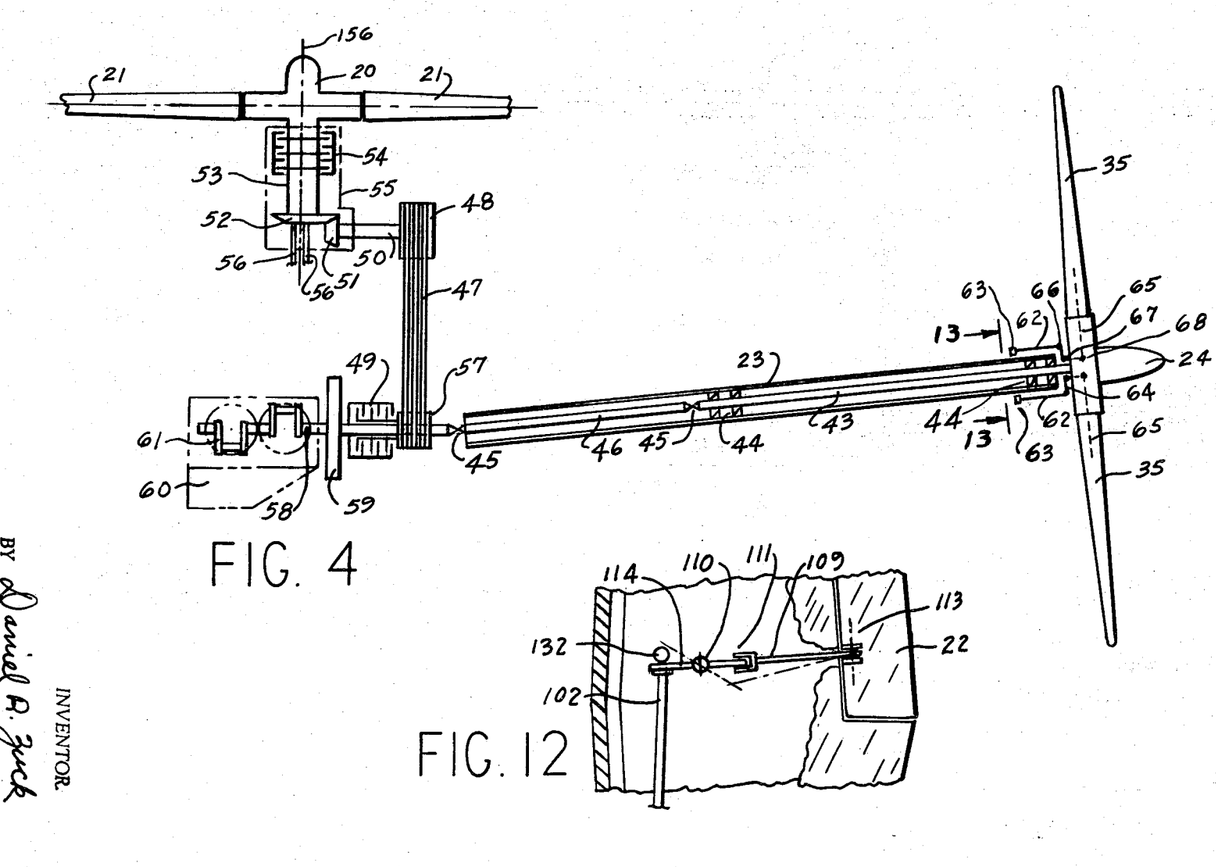
FIG. 4 is a diagrammatical and sectional side view showing the rotor and propeller driving mechanism.
FIG. 12 is an enlarged section through the rotor on line 12–12 in FIG. 11.
Figure 4A:
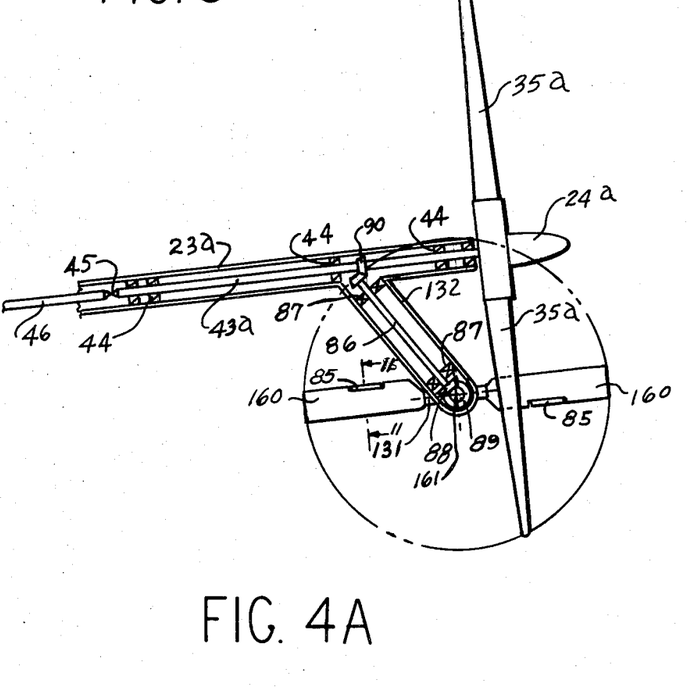
FIG. 4A is a fragmental view of the propeller drive mechanism with an alternate antitorque rotor.

FIGS. 1A, 2A and 4A disclose a unique alternate antitorque intermeshing combination propeller and antitorque rotor for flight in the helicopter configuration and in the airplane configuration. My invention relates to aircraft commonly referred to as a compound helicopter and more particularly to certain new and useful improvements in aircraft which are capable of vertical takeoff and landing at zero horizontal velocity, and which are capable of horizontal cruising flight similar to the conventional winged type airplanes.

This invention is related to my prior patents, Pat. No. 2,959,373 Convertiplane and U.S. Pat. No. 2,776,718 Helicopter Rotor.

The conventionally winged type airplane is a very efficient vehicle for cruising flight, but it is handicapped by relatively high horizontal speeds that are necessary to land the airplane. The conventional helicopter is in the present state of the art can take off and land vertically at zero forward velocity but it suffers badly in efficiency in horizontal flight. Moreover the economical top speeds and cruising speeds of helicopters in the foreseeable future are inherently limited to about 200 nautical miles per hour. Due to the complexity of its mechanisms, the operational costs and maintenance costs of the helicopter are prohibitive.

By definition compounding a helicopter means adding the appendages of the fixed wing airplane, namely the wings, tail surfaces and the propeller, none of which are common with the helicopter.

Many variations of a combination helicopter and airplane have been patented but they all suffer from complexity and lack feasibility in feathering the rotor. In my prior U.S. Pat. No. 2,959,373 I have disclosed a relatively simple means of feathering the rotor. In this invention an improved positive mechanical means is disclosed including a means to cause the feathered rotor to trail positively by aerodynamic reaction in a fore-and-aft relationship.

As in my rotor U.S. Pat. No. 2,776,718 and Convertiplane U.S. Pat. No. 2,959,373 I have disclosed a rotor with the rotor blades rotatable only transversely in the pitch axis thereby producing the so-called rigid rotor. I have disclosed herein a means to trim the entire vertical rotor axis with respect to the C.G. for high speed forward flight, since the rigid rotor blades do not rise and fall vertically in high speed forward flight to reduce the pitch change during each revolution. This means to trim the vertical axis of the hub assembly minimizes the blade pitch angle change per each revolution of the rotor about the axis of rotation.

Therefore the primary object of this invention is to provide a compound helicopter with reduced complexity by utilizing the tail propeller and vertical tail plane for both airplane flight and for opposing the main rotor torque forces during hovering and helicopter flight.

Another object of this invention is to disclose a means of intermeshing the conventional tail propeller of an airplane with the tail rotor of a conventional helicopter in a compound helicopter.

Another object is to disclose improved means to feather the blades of the main lifting rotor of a compound helicopter for horizontal airplane flight during high speed cruising.

Another object of this invention is to disclose means to trim the vertical rotor turning axis with respect to the C.G. for high speed forward flight thereby to reduce the required amount of blade angle variation during each revolution of the rotor.

Another object of this invention is to provide an aircraft with a means to takeoff and land vertically at a zero horizontal velocity and, after having climbed to cruising altitude, provide means to convert to the relatively more efficient horizontal flight means similar to the typically winged type airplane.

Another object of this invention is to incorporate into one vehicle the essential hovering and takeoff and landing characteristics of the helicopter, and the efficient and high speed horizontal flight characteristics of the conventional airplane.

Another object of this invention is to combine the basic essentials of the helicopter with the classical airplane, thereby resulting in an aircraft with greater safety and reliability by virtue of its ability to fly at will either characteristically as an airplane or characteristically as a helicopter, and to fly as an airplane except for takeoff and landing, relieving the complicated helicopter functional units of continuous operation and thus inherently increasing the vehicle's service life by virtue of the considerably higher reliability and service life of the classical airframe airplane flight components, namely wing surfaces, tail surfaces and propeller.

Another object of this invention is to combine the functional flight units of the helicopter and the functional flight units of the airplane into a compatible form and the resulting aircraft having the ability to takeoff and land vertically at zero horizontal velocity and to hover and to convert to conventional airplane flight with the functional helicopter units becoming inactive, thereby reducing aerodynamic drag, increasing mechanical reliability, and increasing the aircraft's cruising speed.

Another object of this invention is to provide improved and interchangeable means to use a common power plant for helicopter flight and conventional airplane flight.

Another object of this invention is to provide a means to feather the helicopter's lifting rotor into a stationary longitudinal position, thereby projecting a minimum frontal area to the cruising flight of the aircraft.

There are many problems associated with combining the classical helicopter with the classical airplane. Aside from the increased complexity of the resulting vehicle, there are additional problems of increased weight, reduced payload, certain seemingly incompatible aerodynamic control problems in transition from helicopter flight to airplane flight, and vice versa, and the problems of disposing of the main rotor during airplane flight. To date the helicopter rotors used in helicopters or proposed helicopters have been permitted to freewheel in the minimum drag pitch when the rotor is not used to support the aircraft during high speed cruising flight. In my invention the rotor is stopped, feathered and carried in the fore-and-aft feathered configuration.

How the foregoing objects and advantages are secured together with others, which will occur to those skilled in the art, will be more apparent from the following description making reference to the accompanying drawings, to which.

The helicopter and the conventional fixed wing airplane are fundamentally incompatible. The efficient high speed cruising speed of the airplane, made possible by the fixed wing rigidly attached to an airplane fuselage, does not lend itself aerodynamically to the vertically ascending and descending ability derived from an a powered overhead helicopter rotor. The helicopter rotor usually produces a downward flow of air with respect to the fuselage and a fixed wing requires an airflow relatively parallel to the fuselage. Herein is one of the basic problems in adapting a helicopter rotor to the fixed wing airplane.

Another problem in combining the helicopter rotor with the airplane is the inherent problem of feathering and stopping the helicopter rotor, and the difficulty of carrying the helicopter rotor stationary in the airstream in the minimum drag attitude when the aircraft flies as a conventional airplane.

The conventional helicopter rotor with its universal blade hinging does not present an airfoil that may be stopped, feathered and stowed in a minimum drag attitude in the airstream in the conventional airplane flight configuration. The rotor of my previous patent number 2,776,718 has a single transverse movement on the airfoil pitch axis with the rotor blade otherwise it is rigidly attached to the rotor hub, thereby permitting the rotor blades to be managed due to their relative rigidity during feathering when converting from helicopter to airplane flight and vice versa.

The problem of transferring the propeller thrust of the airplane to the antitorque of the helicopter heretofore has resulted in heavy weight and complexity. In my invention I am doing this simply and with the lightest possible weight by incorporating into the propeller a cyclic pitch control of the propeller blades in combination with the unique rudder control, thereby eliminating the need for a separate antitorque propeller when the craft hovers and flies as a helicopter.

Through the application of these herein disclosed new and ingenious means and combinations of devices hitherto unknown, I have succeeded in combining the helicopter and airplane in a uniquely useful manner and have solved the above noted problems.

The problem of the downward flow of air from the helicopter's main-lift-rotor conflicting with the fixed wing I have solved by using a freely floating wing which I have patented in patent number 2,347,230 and in 2,959,373, FIGS. 5, 6, 8, 9, and 10.

Additional novelty of my invention will be apparent in the further examination of the drawings and description in the specification.

In referring to FIG. 1 which is a plan view of my aircraft, my proposed aircraft is strikingly conventional in appearance. It has a conventional body 37 with a conventional appearing propeller comprising blades 35 and a hub 24 attached to the rear of the body 37. Outwardly extending from the body 37 behind the pilot's cabin are the wings 15L and 15R supported on a transverse axle 18 with outboard bearing points at 17 to permit the wings to rotate transversely to vary the airfoil angularly in pitch or angle of attack.

The aft part of the body 37 supporting the horizontal tail surfaces 27 and propeller 35 comprises a circular boom 23. Vertically overhead on the body 37 is supported the rotor comprising the blades 21 and hub 20 for rotation of the lifting rotor about the axis of the hub 20.

In referring to FIG. 2 my proposed aircraft in the side view is disclosed in greater detail. The combination of the helicopter features and airplane features are obvious in this view. The main lifting rotor comprising essentially the blades 21 and hub 20 are shown in phantom 21a in the feathered position and in solid 21 in the normal helicopter lifting attitude.

In the said FIG. 2 is shown the pilot's cabin entry door 38, the single front wheel 34, the dual aft wheels 33 supporting the body 37 by means of the outwardly extending landing gear structure 36. The wing 15L is shown in the airplane flight attitude and in the phantom line attitude when the aircraft is hovering as a helicopter. Also in the said FIG. 2 aft of the body 37 and on the aft end of the boom 23 downwardly extending is the vertical fixed fin surface 25. To the aft of the said fin 25 is hingedly attached a swingable rudder means 40 with control means to the pilot in the body 37 at the door 38. The forward edge flap 26 is movably attached to the fin 25 and controlled by the said pilot in the fore part of the body 37.

Figure 3:
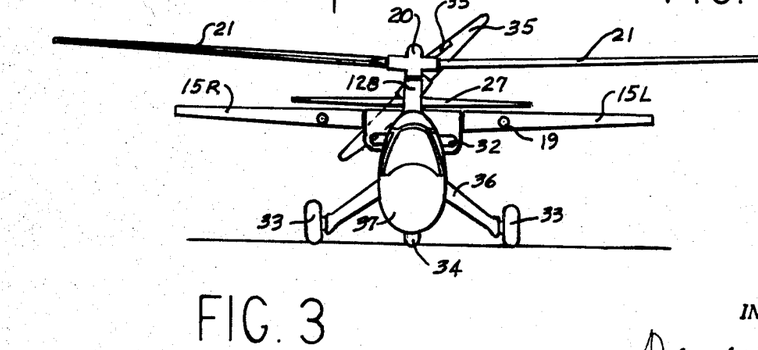
FIG. 3 is a front view of the aircraft.

In FIG. 3 is shown the aircraft in the front view. The dominant parts of the aircraft are in clear evidence, the nose wheel 34, the body 37, the main wheels 33 and gear 36, the engine air cooling inlets 32, the wings 15L and 15R, the rotor supporting pylon 128, the rotor hub 20, the rotor blades 21, the horizontal tail surfaces 27, and the propeller blades 35.

FIG. 1A is a fragmental plan view of an alternate arrangement of the aircraft showing an additional antitorque rotor comprising the rotor blades 160 supported within the hub 131. The propeller hub 24a, boom 23a, horizontal tail surfaces 27a and 28a are similar to the like numbers, less the suffix 2, in the FIGS. 1, 2, and 3. The wings 41L and 41R and surfaces 42L and 42R are similar to the like surfaces 15L and 15R and 16L and 16R in the said FIGS. 1, 2, and 3. FIG. 2A is a fragmental side view showing the alternate arrangement of the aircraft, which discloses additional antitorque comprising the rotor blades 160, and the said antitorque rotor being supported by the downward extending arm 132 which in turn is supported by the tail boom 23a at the intersection of the two said members. To the trailing edge of fin 25a is swingably attached a pilot-controlled rudder 40. The rotor blades 21a are shown in the feathered position.

The propeller blades 35a and antitorque rotor blades 160 are intermeshed through associated gears and shafting so that the rotor and propeller are on a one to one ratio, and during each revolution intermesh and clear each other. The other like numbers are similar to the like numbers in FIGS. 1, 2, and 3. The fin in this configuration does not have a leading edge pilot-controlled moveable slat 26 shown in the companion FIGS. 1, 2, and 3.

FIG. 4 shows a diagrammatical arrangement of the pusher propeller and rotor drive mechanism originating with the power plant 60. The power plant configuration 60 is shown by the phantom line. The crankshaft is shown as item 61 which drives the shaft 58 and flywheel 59. The pilot controlled releasable clutch 49 is secured to the flywheel 59 and drives the pulley sheave 57.

The belts 47 provided with a pilot-controllable belt tightener, not shown, engage the sheave 57 and also engage the sheave 48 which is fixedly secured to the shaft 50, which in turn is fixedly secured to the pinion gear 51. The large bevel gear 52 meshes with the said pinion 51 and is secured to the rotor shaft 53. The said shaft 53 is supported within the housing 55 shown by the phantom line. Within the housing 55 is the brake 54 which is in the form of a clutch designed to stop the rotor during flight, and is pilot controllable to permit feathering of the rotor blades 21 in the minimum drag position. This permits high speed flight similar to a fixed wing airplane during which time the aircraft would be aerodynamically supported by the wings 15L and R in FIGS. 1, 2, and 3. To the shaft 53 is secured the hub 20 and the rotor blades 21.

Extending aft from the sheave 57 is the aft end of shaft 58. It secures to the forward universal joint 45 which connects to the drive shaft 46 which further aft secures to the aft universal 45. The said aft universal 45 connects to the shaft 43 which in the forward end is supported by the forward bearing 44 and in the aft end by the aft bearings 44. The shaft 43 supports the propeller hub 24 and blades 35 at the aft end. The tail boom 23 houses and supports the bearings 44 for rotation of the propeller hub 24 and propeller blades 35.

FIG. 4A is an alternate schematic of the pusher propeller identical to FIG. 4 except as shown. An auxiliary antitorque tail rotor intermeshes with the pusher propeller. This antitorque rotor comprising the blades 160 supported by a hub 131 to rotate on the pivot 161 shown by the pinion gear 89, serves as an alternate main rotor antitorque means in an aircraft configured with a pusher propeller for airplane flight and an antitorque rotor for helicopter vertical takeoff and landing and hovering. The companion pinion gear 88 drives the antitorque rotor by means of shaft 86 which interconnects with pinion gears 90, one of which is secured to the propeller shaft 43a.

The shaft 86 is supported by the bearings 87 at both the upper and lower ends near the pinions 90 and 88. The bearings 87, both upper and lower, are supported within and by the housing 132 which in turn is integrally connected to the propeller drive shaft housing 23a.

The shaft 46, in FIGS. 4 and 4A, in FIG. 4A drives the shaft 43a which drives the propeller hub 24a, and in turn the blades 35a. These blades are identical to the propeller blades 35 in FIG. 4 and have control means to the pilot to vary the pitch for forward thrust of the aircraft when flying as a relatively fixed-wing airplane. The shaft 43a is supported by the bearings 44 which are supported in the housing 23a. Housing 23a is similar to housing 23 in FIG. 4. The shaft 43a is universally connected to the shaft 46 by means of the universal 45 which transmits the propeller and antitorque rotor rotary power from the shaft 46 to the shaft 43a.

Figure 5:
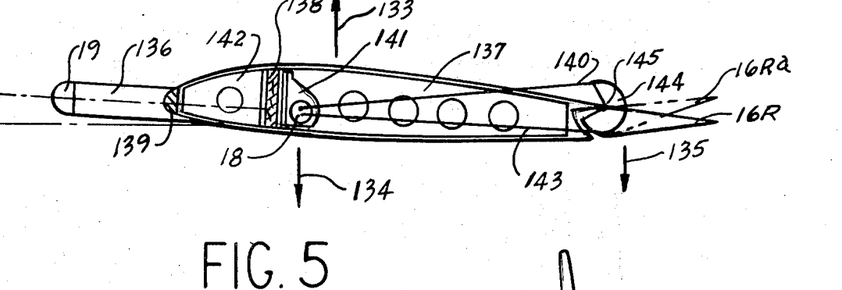
FIG. 5 is an enlarged section through the wing on line 5-5 in FIG. 1.

In FIG. 5 is shown an airfoil section of the wing 15R comprising a structural rib 137 which is secured to a spanwise spar 138. A leading edge spanwise member 139 is connected to the spar 138 by means of a nose rib 142. A counterweight 19 to statically balance the wing 15R on shaft 18 is supported by the tube 136 which connects to the wing 15R at the member 139 and rib 142.

A hinge member 141 fixedly secures to the spar member 138 and hingedly supports the wing on the axle 18. The airfoil 16R known as an aerodynamic surface is hingedly supported to the wing 15R by a hinge 145 for movement by the pilot to selected positions up and down similar to 16Ra. For roll control of the aircraft the aerodynamic surfaces 16L and R in FIG. 1 on the right and left wings 15L and R respectively are rotated differentially; and for elevation angle of attack control the aerodynamic surfaces 16L and R are moved simultaneously in the same direction.

To the aerodynamic surface 16R is secured a sheave quadrant 144 with a coincident turning axis with hinge axis 144. To the quadrant 145 are attached flexible cables 143 and 140 which lead to the center of the axle 18 and from there are routed into the pilot's cockpit to the pilot's controls for ascent, descent and roll control of the airplane by the pilot.

The wing 15R of FIG. 5 is aerodynamically balanced with the center of aerodynamic lift 133 aft of the C. G. shown as the downward reaction 134. This creates a counterclockwise pitching moment 135 about the axle 18 which is resisted and counteracted by the force 135 produced by the aerodynamic action on 16R. The aerodynamic force 135 is varied in magnitude by the relative angle of the control surface 16R to the wing 15R and is controlled by the pilot. When the surface 16R is moved to the position 16Ra a larger force at 135 is produced and the wing 15R will rotate clockwise producing a larger lift 133.

Figure 6:
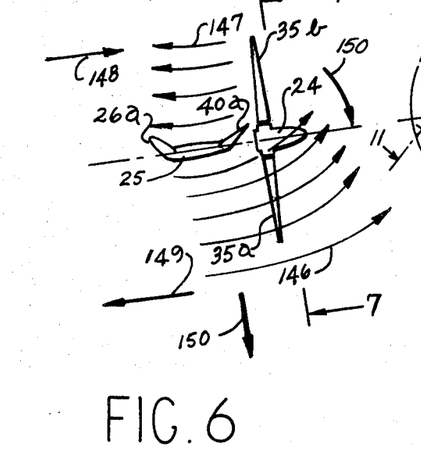
FIG. 6 is an enlarged section through the tail on line 6-6 in FIG. 2 showing the airflow pattern.
Figure 7:
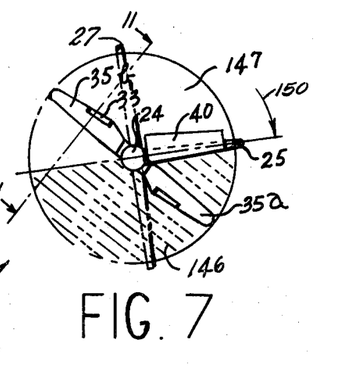
FIG. 7 is view taken on line 7-7 in FIG. 6 showing the divided semicircle of the fore-and-aft airflow.

In the FIG. 6 is shown the aerodynamic action which produces a large antitorque force 150 which results from the unique action of the airflow directed by the propeller blades 35 on the fin 25 in combination with the rudder 40 and leading edge flap 26. The airflow direction 146 is opposite in direction to the airflow direction 147 and is produced by the action of the propeller as it complete its 360° of revolution. As shown in FIG. 7, the semicircle in the near side of the fin the airflow 146 in aft direction is produced by the propeller blade 35a at a pitch angle which accelerates the airflow aft, while in the semicircle in the far side of the fin 25 the airflow 147 is reversed to a forward direction by a negative pitch angle of the blade 35b to move the air forward. This produces an aerodynamic reaction 150 on the fin together with the forces, couple 148 and 149, which directly counteract the torque at the vertical axis 156 of the main lifting rotor. The couple 148 and 149 result from the varying pitch angle of the blades during each revolution from one semicircle to the other as described above.

Figure 13:
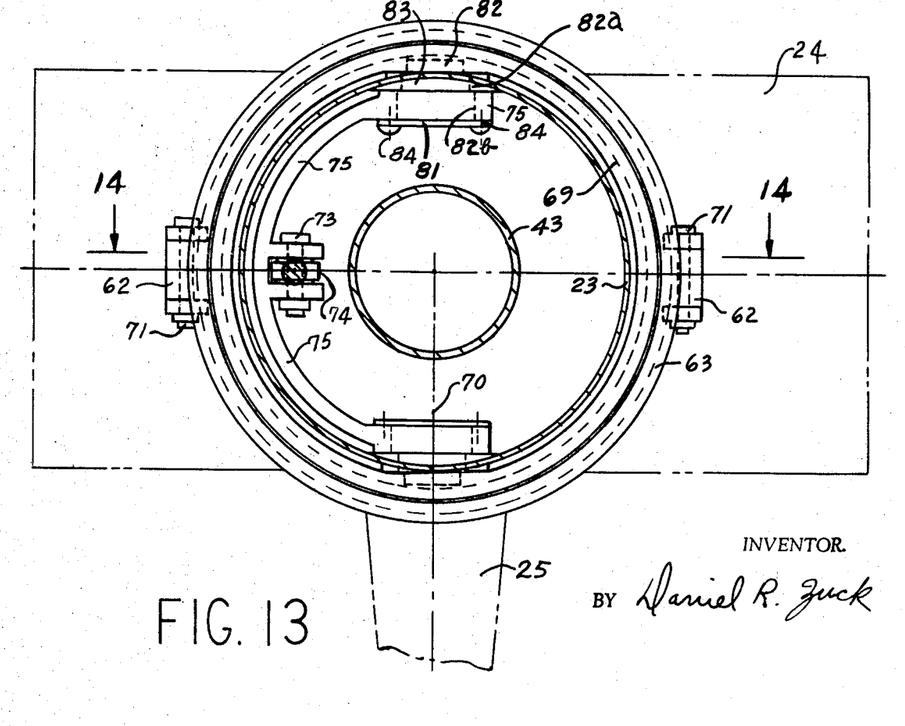
FIG. 13 is an enlarged section through the propeller drive on line 13–13 in FIG. 4 showing the swash plate mechanism to vary the propeller pitch angle during each revolution of the propeller.
Figure 14:
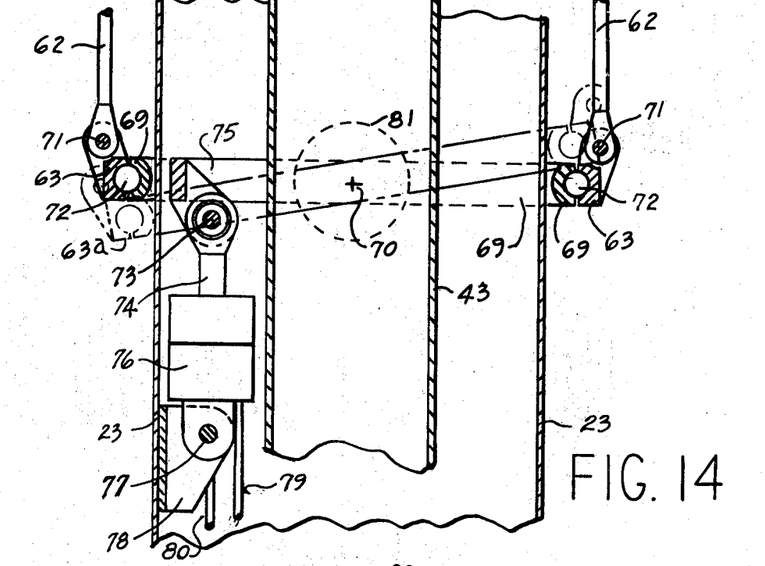
FIG. 14 is a section through line 14–14 in FIG. 13.

The propeller blade pitch angles described in positions 35a and 35b are attained by a swash plate which is shown in FIGS. 13 and 14. The swash plate is comprised of a ring 69 which is supported on a shaft 82 keyed to 69. At 82a said shaft 82 pivots in the journal box 83, and at the shaft 82b is keyed to the yoke 75. The shaft 82 is retained by the cover plate 81 which is attached to the said yoke 75 by means of the screws 84.

The yoke 75 pivots on the axis 70 and is actuated by the cylinder 76. The said cylinder 76 is anchored to the fuselage boom 23 by fitting 78 at the pin 77. The hydraulic tubes 79 and 80 at the pilot's control carries hydraulic pressure to the cylinder 76 forcing the piston rod 74 a in and out applying an actuating force to the pin 73 which connects the rod 74 and to the ring 75.

The ring 69 has a ball race section to retain the ball bearings 72. In turn the ring 63 has a complementary ball race to retain the said ball bearings 72. The balls 72 lock the rings 69 and 63 together so that a thrust by the piston rod 74 will move the ring 63 to position 63a. The ring 63 means of the balls 72 is free to rotate with the propeller 24. The links 62 shown in FIGS. 13, 14 and 4 are pinned to the ring 63 by 71 and at 66 by a pin 66 in FIGS. 4 and 15.

In FIGS. 4 and 15 the rods 62 translate their motion to the rocker arms 64 which are pinned at 67 to the propeller hub 24. The said rocker arms pivot at 67 and translate radial push and pull motions to the links 65 in FIG. 4 which actuate the aerodynamic tabs 33 in the propeller blades 35 in FIG. 7. In FIGS. 4, 7, 13 and 14 the piston rod 74 positions the swash plate by means of hydraulic pressure at the direct control of the pilot. The swash plate in turn regulates the tabs 33 which regulate the propeller blade pitch angles as the propeller rotates through each semicircle of rotation to produce the airflow shown in one semicircle shown in FIG. 6 and an opposite airflow in the other semicircle. The degree of difference is controllable by intermediate positions of the yoke 75. The propeller blades 35 are freely supported on the feather axes by the hub 24. The blades 35 are aerodynamically balanced similar to the rotor 21 in FIG. 11 where the reaction force of the propeller at the hub 24 would be 157, and the pitch control force 159 would be provided by the tabs 33, and the main thrust of the blade 35 would be 158. The blade 35's angle attitude on the feather axis is varied by the pilot through the tabs during cyclic pitch control when the aircraft is in the hovering mode of flight to counteract the torque of the rotor 20 and 21 in FIG. 1.

Figures 6A, 8:
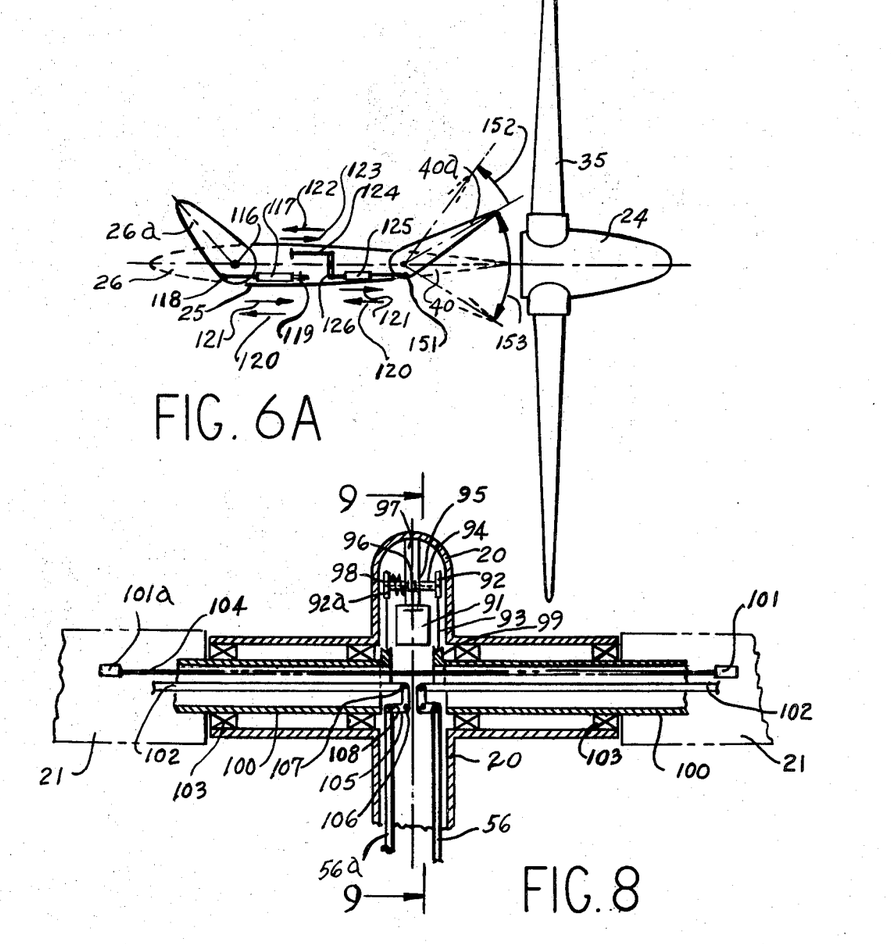
FIG. 6A is an enlarged section similar to FIG. 6 so showing surface travels and control linkages.
FIG. 8 is an enlarged section taken through the rotor head on line 8-8 in FIG. 1.

In FIGS. 6 and 6A is shown the mechanism to utilize the unsymmetrical airflow produced by the propeller to produce an antitorque reaction 150 to the helicopter rotor. First the thrust of the propeller in one semicircle is counterbalanced by an opposite thrust in the other semicircle producing an antitorque couple 148 and 149. Further the aerodynamic airflow reaction on the fin 25 produces another helicopter rotor antitorque force 150. The high velocity airflow 146 over the fin 25 with the surfaces 26 and 40 depressed to the positions 26a and 40a creates a low pressure on the near side of the fin 25 which results in the force 150. Similarly the opposite airflow 147 of lesser velocity creates a high pressure area on the far side of the fin 25 further adding to the force 150.

In FIG. 6A is shown the means at the pilot's control by which the surfaces 26 and 40 are moved from the faired position to the positions 26a and 40a. The hydraulic cylinder 117 is anchored to the fin 25 at 119 and is pinned to the leading edge flap 26 at 118 and can move the said flap 26 in the directions denoted by the arrows 120 and 121. The hydraulic cylinder 125 is pinned to the swinging lever 126 and to the rudder 40, and by means of hydraulic pressure moves the rudder 40 from the faired position to the position of 40a.

The link 124 connects to the beam 126 which leads directly to the pilot's rudder control and the pilot directly moves this link in the direction of the arrows 122 and 123 producing the linear motion denoted by the arrows 120 and 121 which gives the pilot direct control to the rudder 40 in the extremes noted by the broken lines. The said beam 126 is pivotally supported at the center line of the fin 25 and pivotally connects to the link 124 and hydraulic cylinder 125. The leading edge flap 26 is pinned to the fin 25 for rotation at the hinge 116 and the rudder 40 is hinged to the fin 25 at the hinge 151.

When the cylinder 125 is actuated to move the rudder 40 from the faired position to the position at 40a, by means of the pivoted beam 126 through the means of the pilot's rudder control to link 124, the rudder can be further moved in the direction of the arrow 152. A pilot's rudder pedal movement to translate a motion 122, 121 will move the rudder surface 40 in the direction of arrow 152. When the hydraulic cylinder 125 returns the rudder surface 40 to the faired position the normal rudder movement is shown by the arrow 153 which is actuated by the pilot's rudder pedals. An auxiliary pilot's trim control positions the leading edge surface 26 and rudder surface 40 from the faired to the unfaired positions.

The main helicopter rotor is similar in aerodynamic action to my rotor patent number 2,776,718, as shown in FIGS. 4 and 7 of said patent, which is further in similarity to my patent number 2,347,230, FIG. 4.

The rotor blades 21 are spanwise hinged on the feather axis at the hub 20 in FIG. 8 by means of the structural member 100. Said member 100 is supported in the hub for rocking of the blade in pitch by means of the bearings 103.

The major centrifugal force load of the blades is absorbed by the interconnecting flexible member 104 between the blades 21. The said member 104 anchors to the blades at 101 and 101a.

Figure 11:
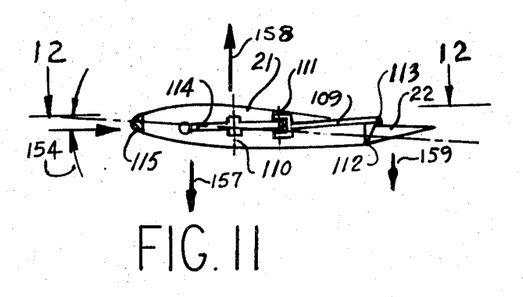
FIG. 11 is an enlarged section taken on line 11–11 in FIG. 1.

The control push rods 102 connect to the pivoting beam 114 in FIG. 11 and 12 to actuate the aerodynamic surface 22. The push rods 102 are connected to bell cranks 105 within the rotor hub and shaft 20 and pivot at 106. At 108 the said bellcranks 105 connect to the push rods 56 and 56a which in turn connect to a swash plate, not shown, and to the pilot's control for the pilot's movement of the blades in pitch under the aerodynamic action of the servo tab 22. As is obvious from FIGS. 11 and 12 the action of the rod 102 translates through lever 114, pivot 110, pin 111, link 109, hinge 112, and pin 113.

A rotor trim is provided in FIG. 10 to permit displacement to the rotor from 20 to 20a causing the blades to rotate in a displaced plane of rotation from 21 to 21a. The axis of rotor rotation is displaced by a hydraulic cylinder 130 which tilts the rotor on the fitting 127 which in turn is secured to the helicopter body. The hydraulic cylinder is anchored to the fuselage body by fitting 31.

The displacement of the rotor hub from 156 to 156a is done during translation from hovering flight to high speed forward flight where the advancing blade 21 has a greater air a velocity than the retreating blade 21, thereby requiring reduction of the pitch angle of the upwind blade of the rotor blades during each revolution in high speed flight.

In my patent number 2,959,373 I have disclosed a means in FIG. 2 to automatically feather the rotor blades when the rotor ceases to rotate. In this patent I have provided a more positive means to feather the blades 21 as shown in FIGS. 8, 9, and 16.

An electric motor 91 secured to the hub 20 by member 97 in FIG. 8 provides a torque to the miter pinion gear on center line 96 and complementary miter gears within housing 95 to transmit a torque to sheaves 92 and 92a. The torque to sheave 92a is translated from the miter gear by means of a flexible spring 98. This means that this blade is not rigidly feathered whereas the blade connected to sheave 92 is rigidly feathered in the feathered mode by rigid attachment to the motor. When the motor 91 is not in the feather mode the blades 21 float freely. Feathering one blade rigidly and simultaneously the other blade 21 flexibly permits the feathered rotor to trail in the airstream aerodynamically stable.

The aft or trailing fixed blade 21 in FIG. 8 in the rigidly feathered position 21a responds aerodynamically as a trailing edge rudder in the airstream opposing the flexibly feathered restraint provided by the spring 98 to the forward blade 21 in position 21a. The spring 98 will permit rotation of the advancing blade 21 in position 21a on the feather axis to relieve the side loads from aerodynamic forces when the aircraft is in airplane flight with the rotor feathered in position 21a. The aft trailing blade 21 being rigidly fixed on the feather axis in position 21a will respond to the side aerodynamic forces similar to a vertical aerodynamic rudder and retain the rotor fore-and-aft in the airstream with the blades thus feathered in position 21a. The trailing edges and leading edges of the blades 21a, when feathered, are aligned vertically with the trailing edges of each blade 21a being in the higher position.

The aft trailing blade 21 is restrained rigidly in the vertical position 21a by means of the sheave 92 which is rigidly secured to both the shaft 94 and a miter gear within the housing 94 which is geared with the miter pinion gear rotating on the centerline 96 within the electric motor 91 by means of power provided by the said motor 91.

Conversely the advancing forward blade 21 in the feathered mode is restrained flexibly in the vertical position 21a by means of the sheave 92a journaled for free rotation on shaft 94. Torque to the sheave 92a is provided through the flexible steel coil spring 98 coaxial with shaft 94 and connecting to the miter gear also journaled on the shaft 94 for free rotation with the said miter gear in mesh with the miter pinion gear within the housing 94, which is rotated by the electric motor 91 on the line 96. The forward advancing blade 21 in the feathered position 21a will be constrained in a flexible manner by the coil spring 98.

The forward advancing, flexibly constrained blade 21, and the trailing rigidly constrained blade 21 will be driven differentially on the feathering axis to the feathered position 21a by the common miter pinion gear on line 96 within the housing 94. The electric motor 91 drives the said miter pinion gear at the command of the pilot to move the blades 21 on the feather axis to the position 21a where the said miter gear is held by electrical power means during the feathered mode of the rotor when the aircraft is in the airplane flight mode.

To unfeather the rotor the electrical restraining means to the miter pinion gear is released and the rotor blades 21 are free to float free on their feather axes differentially guided by the miter pinion gear to the unfeathered position of the blades 21. The rotor then can rotate on the hub 20 centerline and perform as a helicopter rotor. In FIG. 8 the electric motor 91 is fixedly secured to the hub 20 on the centerline 96 by means of the structural extension 97 of the motor housing enclosing the said motor 91.

In FIGS. 8, 9, and 16 cables 93 are anchored to the sheaves 99, and 92 and 92a. In turn the sheave 99 is fixedly secured to the member 100 which is an integral structural part of the rotor blade 21. Thus a torque delivered by the motor 91 in FIG. 8 rotates the 9 21 in the direction of arrow 155 in FIG. 9.

In FIGS. 1, 2, and 3 the horizontal tail is comprised of horizontal surfaces 27 hingedly attached to the fuselage boom 23 on member 29 which is forward of the 25 percent M.A.C. of the airfoil. The counterweights 30 secured to the surfaces 27 statically balance the horizontal surfaces about the hinge member 29. The surfaces 28 are hingedly attached to the trailing edges of the surfaces 27. Control means to the pilot not shown are provided to actuate the surfaces 28 to elevate and trim the aircraft for forward flight. 31 is a structural airfoil rib in the horizontal aerodynamic surface 27.

In FIGS. 1A and 2A the surfaces 27a, 28a, the member 29a and counterweight 30a perform like functions to the like numbers minus the suffix a in FIGS. 1, 2, and 3.

The all movable tail surface 27 on the hinge 29 may be moved 90° or more for vertical takeoff and landing either by mechanical actuating means not shown or aerodynamic means as shown in FIGS. 8, 9, and 10, and FIG. 17 of my patent 2,959,373.

The wings 15L and R are supported on the axles 18 by the fitting 141 and bearing 17 in FIGS. 1 and 5. The wings 15L and R are free to rotate clockwise or anticlockwise as shown by the arrow 145.

The wings 15L and R are also statically balanced on the axle 18 by means of the counterweights 19 supported by the tube 136 which are attached to the leading edge of the wing 15L and R.

The wings 15L and R are also aerodynamically balanced as noted by the forces in the direction of the arrows 133 vertical which is the center of lift upward and the balancing forces 134 downward, which is the weight of the aircraft, and the aerodynamic force 135 downward.

As the angle of attack increases, the force 133 increases which places a rotation 145 on the wings 15L and R. This in turn is counteracted by the force 135 which is varied by the pilot by means of adjusting 16R to 16Ra to an intermediate position.

In FIG. 11 the rotor airfoil functions in a similar manner to the wing airfoil in FIG. 5. The downward aerodynamic lift 159 of the aerodynamic tab 22 is controllable by the pilot to vary the angle of attack of the rotor.

In FIGS. 8, 9, and 11 the rotor 21 is free to feather on the bearings 103. The blade 21 is also statically balanced on the feather axis by means of the counterweight 115 integral with the leading edge of the blades 21.

In FIGS. 2A and 4A the main rotor antitorque rotor blades 160 are freely supported on the feather axis by the hub 131. The blades 160 are aerodynamically balanced similar to the rotor 21 in FIG. 11 where the force of the rotor at the hub 131 would be 157 and the force 159 would be provided by the tabs 85, and the main lift of the blade 160 would be 158. The blade 160's angle attitude on the feather axis is at the control of the pilot through control of the tabs 85.

My compound helicopter has the following unique characteristics:

1. It can takeoff and land vertically at zero forward velocity using the helicopter rotor and the pusher propeller to counteract the rotor torque by means of the peculiar aerodynamic action of the propeller on the fin. In the alternate configuration, FIG. 2A, an antitorque rotor 160 is used in the conventional helicopter manner.
2. After the aircraft is airborne it uses its pusher propeller to accelerate in a forward manner as the vehicle flies as an autogiro with all engine power being finally absorbed by the propeller alone with the main rotor free wheeling after release of the driving belt 47 tension to the power plant 61, FIG. 4.
3. In the autogiro mode the rotor hub is trimmed for high speed flight for minimum to zero blade pitch change during each rotor revolution.
4. In the autogiro mode the wings begin to lift the vehicle and the rotor pitch is reduced to transfer lift of the machine to the wings.
5. When the wings receive all the weight and the rotor pitch is reduced to zero the rotor r.p.m. slows down and is reduced to a static position with reference to the fuselage by means of the brake 54 in FIG. 4.
6. When the rotor blades are stationary with the blades fore-and-aft and the rotor blade forward that has the flexible torque spring 98 in FIG. 8, the blades are feathered in the direction of the arrow 155. in FIG. 9.
7. The aircraft is now in the airplane-wing-and-pusher-propeller mode using the wings 15 for lift, the horizontal tail 27 for longitudinal stability and guidance, the fin 25 for directional stability and guidance, and the pusher propeller, 35 and 24, for thrust. The rotor 21 is fully feathered.

For landing the reverse action of the above sequence is utilized.

1. The speed of the aircraft is reduced.
2. The brake 54 is released in FIG. 4.
3. The rotor is unfeathered through opposite motor 91 rotation in FIG. 8.
4. Pitch is added to the rotor blades through control servo surfaces 22. This causes the rotor to rotate to flight r.p.m.
5. As the rotor reaches full r.p.m. the wing lift is reduced through control surfaces 16R controlled by the pilot. Power from the engine is delivered to the rotor by tightening the belts 47.
6. The speed of the vehicle reduces to hovering and vertical ascent as the pusher propeller interacts as shown in FIGS. 6, 6A and 7 with the fin to produce a rotor antitorque compensation, or as in FIGS. 1A and 2A, showing an alternate antitorque tail rotor.
7. The wings under aerodynamic action from the rotor downflow air take a downward position as shown in my U.S. Pat. No. 2,959,373, FIG. 6, position 2a.

Although I have herein shown and described my invention in what I have conceived to be the most practical and preferred embodiment it is recognized that departures may be made therefrom within the scope of my invention, which is not to be limited to the details disclosed herein but is to be accorded the full scope of the claims so as to embrace any and all equivalent structures.

I claim:

1. A helicopter for hovering flight and vertical takeoff and landing, a vertical fin comprising a fixed surface and a moveable surface on the trailing edge of said surface and a moveable surface on the leading edge of the fixed surface, an adjacent propeller supported aft of the fin for rotation to accelerate the airflow over the fin, the propeller comprising one or more airfoil blades supported by a center hub for individual transverse angular pitch variation of the blades independently in the feather axis, a swash plate means associated with the propeller and interconnecting means to the propeller blades to vary the pitch angle of the individual propeller blades during each revolution of the propeller thereby to impose different air velocities on the right and left surfaces of the fin to counteract the torque of the helicopter rotor when hovering.

2. A helicopter with a lifting rotor for vertical takeoff and landing, a vertical fin comprising a fixed surface, and a moveable surface on the trailing edge, adjacent the trailing edge of the fin a propeller having swash plate means supported for rotation to swash plate the airflow over one surface of the fin and to decelerate or reverse the airflow over the opposite surface of the fin to produce a variable antitorque moment in opposition to the lifting rotor.

3. In a helicopter for vertical takeoff and landing flight a vertical fin, an adjacent propeller supported for rotation and to accelerate the airflow over the fin, the propeller comprising one or more airfoil blades with the blades supported by a center hub for individual transverse angular pitch variation in the feather axis of the blades independently, a swash plate means associated with the propeller blades and interconnecting means to the propeller blades to vary the pitch angle of the individual propeller blades differentially during the revolution of the propeller to provide differential airflow on each side of the fin to counteract the torque of the helicopter rotor during vertical takeoff and landing.

4. In a helicopter for vertical takeoff and landing and for flight, a vertical fin comprising a fixed surface and a moveable surface on the trailing edge of the fixed surface, an adjacent propeller supported aft of the said fin for rotation and to accelerate the airflow over the fin, the propeller comprising one or more airfoil blades supported by a center hub for individual transverse angular pitch variation of the blades independently in the feather axis, a swash plate means associated with the propeller blades, and interconnecting means to the propeller blades to vary the pitch angle of the individual propeller blades during each segment of revolution of the propeller to counteract the torque of the helicopter when over hovering.

5. An aircraft comprising a left- and right-hand wing, a fuselage, a vertical fin and horizontal tail surface aft of the wings, aft of the said tail surfaces a pusher propeller supported for rotation, a helicopter lifting rotor substantially at the center of gravity above the fuselage for vertical takeoff and landing, a powerplant to drive the helicopter rotor with interconnecting driving means to the propeller, said propeller comprising one or more airfoil blades supported concentrically by a center hub for rotation of the propeller, the hub having rotatable means for each blade to rotate transversely in the feather axis to vary the blade pitch angle, a swash plate means associated with the said propeller blades with interconnecting means thereto and control means to the pilot to vary the pitch angle of the said propeller blades independently of each other during each revolution of the propeller, said swash plate and propeller means providing an airflow at the vertical fin which can be varied differentially from one side of the fin to the other thereby producing main rotor antirotor torque moments for vertical takeoff and landing and hovering flight, and equal airflow on each side of the fin for level flight to provide forward thrust to the aircraft.

6. A helicopter with a lifting rotor for takeoff and landing and level flight, a pusher propeller supported for rotation, opposing the lifting rotor an antitorque rotor supported on an axis of rotation 90° to the axis of rotation of the said pusher propeller, the said propeller's and said antitorque rotor blade's arc of rotation located, and having positive connecting means, to intermesh during each revolution.

7. An aircraft comprising left- and right-hand wings, a fuselage, a vertical fin and horizontal tail surfaces, a pusher propeller supported for rotation, a helicopter lifting rotor substantially at the center of gravity above the fuselage for vertical takeoff and landing and level flight, an antitorque rotor supported on an axis of rotation 90° to the said propeller's axis of rotation, said propeller's and said antitorque rotor blade's arc of rotation located, and having positive connecting means, to intermesh during each revolution of said propeller and said antitorque rotor.

8. A helicopter lifting rotor comprising a hub, rotor airfoil blades freely supported in the said hub for rocking the blade airfoil exclusively on the feather axis, the airfoil blades supported in the hub forward of the center of lift of the blade's airfoil, an aerodynamic servo tab hingedly attached to the trailing edge of the blade airfoil with control means to the pilot to vary the tab's angle and aerodynamic force on the rotor blade, thereby adjusting the feather angle and pitch angle of the rotor blade, means supporting the center hub of the main lifting rotor for vertical displacement from the centerline of the aircraft to provide offset rotor lifting moments to counteract the adverse rolling moments during high speed flight when the advancing and retreating blades due to disparity in air velocity produce unequal lift and cause the aircraft to roll, and pilot controllable actuating means to displace the rotor hub from a vertical centerline position of the aircraft.

9. An aircraft comprising left-hand and right-hand wings, a fuselage, vertical and horizontal tail surfaces, propeller thrust means, a helicopter lifting rotor for takeoff and landing, the rotor comprising hub means and blade means, the blade means supported within the hub for rocking the blade on the feather axis of the blade airfoil, mechanical actuating means associated with the rotor hub to rotate the trailing blade airfoil into the feathered vertical position and to rigidly retain the trailing blade in a vertical fin position to cause the rotor to remain stable in a feathered position by aerodynamic action of the trailing blade in high speed flight.

10. In an aircraft for vertical takeoff and landing, a vertical fin comprising a fixed surface and moveable surfaces on the leading and trailing edges of the fixed surface, an adjacent propeller supported aft of the fin for rotation and to accelerate the airflow over the fin, the propeller comprising one or more airfoil blades supported by a center hub for individual angular pitch variation of the blades independently on the transverse feather axis, a swashplate means associated with the propeller blades, and interconnecting means to the propeller blades to vary the pitch angle of the individual propeller blades during each segment of revolution of the propeller to provide increased airflow velocity on one side of the vertical fin and to provide reduced airflow velocity on the opposite side of the fin thereby to produce a force transverse to the propeller's rotation axis.

11. An aircraft comprising left and right-hand wings, a fuselage, vertical and horizontal tail surfaces, engine means providing forward thrust means to the aircraft, a helicopter lifting rotor for takeoff and landing, the rotor comprising hub means and airfoil blade means, the said blade means supported within the hub for rocking the blade on the feather axis of the blade airfoil, braking means to the rotor to stop the rotor in flight for airplane flight, mechanical actuating means associated with the rotor hub to rotate the trailing blade of the rotor into the feathered vertical position and to rigidly retain the trailing blade in a vertical fin position.

12. An aircraft as in claim 11 having mechanical actuating means associated with the rotor hub to rotate the trailing blade of the rotor into the feathered vertical position and to retain the trailing blade in a vertical fin position to cause the rotor to remain aerodynamically stable when feathered, mechanical actuating means to the other blade of the rotor with resilient connection means to raise the trailing edge of the airfoil upward in the feathered position thereby allowing the airfoil blade to rotate on the feather axis when subjected to aerodynamic side loads when the helicopter rotor blade is in the feathered attitude.

13. A helicopter lifting rotor comprising a hub, rotor airfoil blades supported in the said hub for rocking the blade airfoil exclusively on the feather axis, means to adjust the feather angle and pitch angle of the rotor blade, means supporting the center hub of the main lifting rotor for horizontal displacement from the vertical centerline of the aircraft to provide off set rotor lifting moments to counteract the adverse rolling moments during high speed flight when the advancing and retreating blades due to disparity in air velocity produce unequal lift and cause the aircraft to roll, and pilot controllable actuating means to displace the rotor hub from a vertical centerline position of the aircraft.